(12) United States Patent
Velan et al.

(10) Patent No.: US 11,392,390 B2
(45) Date of Patent: Jul. 19, 2022

(54) METHOD AND SYSTEM FOR AUTOMATICALLY BOOTING A COMPUTER TO RUN FROM A REMOVABLE DEVICE

(71) Applicant: FixMeStick Technologies Inc., Westmount (CA)

(72) Inventors: Corey Velan, Westmount (CA); Martin Algire, Montreal (CA); Karen Gabrielyan, Montreal (CA); Max Martel, Montreal (CA); Nicolas Boisvert, Montreal (CA)

(73) Assignee: FixMeStick Technologies Inc., Westmount (CA)

( * ) Notice: Subject to any disclaimer, the term of this patent is extended or adjusted under 35 U.S.C. 154(b) by 162 days.

(21) Appl. No.: 16/761,679

(22) PCT Filed: Nov. 5, 2018

(86) PCT No.: PCT/CA2018/000212
§ 371 (c)(1),
(2) Date: May 5, 2020

(87) PCT Pub. No.: WO2019/084665
PCT Pub. Date: May 9, 2019

(65) Prior Publication Data
US 2021/0064381 A1    Mar. 4, 2021

Related U.S. Application Data

(60) Provisional application No. 62/581,944, filed on Nov. 6, 2017.

(51) Int. Cl.
G06F 9/44 (2018.01)
G06F 9/4401 (2018.01)
G06F 9/451 (2018.01)

(52) U.S. Cl.
CPC ............ *G06F 9/441* (2013.01); *G06F 9/4411* (2013.01); *G06F 9/453* (2018.02)

(58) Field of Classification Search
CPC ......... G06F 9/441; G06F 9/453; G06F 9/4411
See application file for complete search history.

(56) References Cited

U.S. PATENT DOCUMENTS 7,966,484 B1    6/2011    Deetz et al.
8,028,158 B1    9/2011    Streuter et al.
(Continued)

OTHER PUBLICATIONS

EPO extended European search report, international app. No. PCT/CA2018/000212, dated Jul. 29, 2021.
(Continued)

*Primary Examiner* — Zahid Choudhury
(74) *Attorney, Agent, or Firm* — Bradley Arant Boult Cummings; Timothy L. Capria; Alexandra C. Lynn

(57) ABSTRACT

A removable device and method for automatically booting a computer running a standard operating system (OS) into an alternative OS. The method comprises a user inserting the removable device into the computer, and the user launching an application stored on the removable device for booting guidance. The user directs the application to boot the computer into the alternative OS, whereupon the application determines a first booting technique to be used on the computer and configures the computer accordingly. The application restarts the computer in an attempt to boot into the alternative OS. If booting the alternative OS fails, the computer boots back into the standard OS, whereupon the application determines a next best booting technique and configures the computer accordingly. This process continues until the alternative OS is successfully booted, or, failing that, the user is given manual booting direction.

9 Claims, 2 Drawing Sheets

(56) References Cited

U.S. PATENT DOCUMENTS

| | | | |
|---|---|---|---|
| 2008/0052507 A1* | 2/2008 | Chow | G06F 21/568 |
| | | | 713/2 |
| 2012/0011354 A1* | 1/2012 | Owen | G06F 9/441 |
| | | | 713/2 |
| 2012/0072398 A1* | 3/2012 | Streuter | G06F 8/65 |
| | | | 707/654 |
| 2014/0006728 A1 | 1/2014 | Koide et al. | |
| 2014/0025942 A1* | 1/2014 | Nakazima | G06F 9/4408 |
| | | | 713/2 |
| 2014/0115316 A1* | 4/2014 | Owen | G06F 21/575 |
| | | | 713/2 |
| 2014/0325273 A1 | 10/2014 | Streuter et al. | |
| 2020/0036804 A1* | 1/2020 | Ren | H04L 67/26 |
| 2020/0356254 A1* | 11/2020 | Missig | G06F 3/04886 |

OTHER PUBLICATIONS

PCT International Search Report of PCT/CA2018/000212 (corrected), dated Feb. 6, 2019.

PCT Written Opinion of the International Searching Authority of PCT/CA2018/000212, dated Feb. 4, 2019.

Cariboo, Wubi—Community Help Wiki, last edited Jun. 26, 2014, retrieved from https://help.ubuntu.com/community/Wubi on May 9, 2020.

Hakuna Matata, Wubiuefi, last edited Apr. 28, 2020, retrieved from https://github.com/hakuna-m/wubiuefi/wiki on May 9, 2020.

Westover, PocketDesktop (16GB) Review, published Jan. 31, 2013, retrieved from https://www.pcmag.com/reviews/pocketdesktop-16gb on May 9, 2020.

* cited by examiner

METHOD AND SYSTEM FOR AUTOMATICALLY BOOTING A COMPUTER TO RUN FROM A REMOVABLE DEVICE

TECHNICAL FIELD

The present disclosure relates to the field of computers, and more particularly to a method for automatically booting a computer to run an alternative operating system from a removable device.

BACKGROUND OF THE INVENTION

Modern computers rely on a few technology standards in order to boot an operating system (OS). Basic Input/Output Systems (BIOS) and Unified Extensible Firmware Interfaces (UEFI) are two of those well-established technologies that many computer manufacturers rely on to have their systems boot into an OS. Presently, UEFI in particular is applied in the vast majority of new computer systems produced and sold.

While these technologies, and UEFI in particular, work well when booting the main OS of the computer, there are multiple issues encountered when attempting to boot the same computers to alternative or secondary operating systems carried on removable storage devices.

Computer systems certified for Microsoft's Windows 8 OS and for higher versions do support the booting of operating systems from removable devices through UEFI-based techniques. However, this is achieved through a custom firmware titled User Interface included in the Windows OS on the computer and is not a generic mechanism.

Furthermore, testing reveals that some computer systems do not boot reliably from removable devices despite their Microsoft certification.

SUMMARY OF THE INVENTION

The present disclosure provides a method of booting a Windows OS-based computer to run an alternative operating system from a removable device by applying a sequence of several different automated and manual booting techniques.

The combination of different booting techniques involved in the present method provides for a simplified and automated booting flow for the user and maximizes the likelihood of such computers to successfully boot into the alternative operating system from a removable device. The automated booting techniques utilized in the present method avoid using the custom firmware User Interface that is built into Windows OS versions 8 and higher.

In order to have a Windows-based computer boot into the alternative operating system residing on a removable device, the user launches a dedicated application (referred to hereon as RFMS) for booting guidance.

RFMS allows the user to boot into the alternative OS through a simplified and automated user interface. RFMS makes the proper determination of the booting technique to be used on a computer, configures the computer accordingly, and then restarts it.

Upon the subsequent booting of the computer back into the Windows OS (after having succeeded or failed to boot the alternative OS from the removable device) RFMS automatically starts up, determines whether the alternative OS successfully started, and provides the user with further simplified user interface to:

a) use the same automated booting technique to reboot the computer into the alternative OS again if the prior attempt was successful;
b) utilize the subsequent suitable automated booting technique to reboot the computer into the alternative OS;
c) guide the user into manual booting into the alternative OS if all suitable automated booting techniques have failed.

The method uses a combination of the following booting techniques to increase the likelihood of booting a Windows-based computer into an alternative operating system carried on a removable device:

On UEFI-based Windows PC's:
    Direct HDD UEFI booting
    USB UEFI booting (with and without port adjustment)
    Bcdedit tool-based booting
    Guidance for users to manually boot into OS from the removable device through BIOS menu On non-UEFI PC's with Windows Vista or higher:
    Grub4Dos-based booting
    Guidance for users to manually boot into OS from the removable device through BIOS menu On Windows XP-based PC's:
    boot.ini-based booting (on Win XPs)
    Guidance for users to manually boot into OS from the removable device through BIOS menu.

The booting techniques are applied by RFMS in a priority order mentioned above for each type of Windows-based computing device.

If one booting technique fails to boot the computer into the alternative operating system carried on a removable device, the guiding RFMS application automatically starts upon reboot into the host Windows OS and displays a user interface which guides the user to the subsequent booting attempt with the next technique in the priority list.

The process of attempting to boot into the alternative OS, and later having the computer boot back into Windows and the RFMS application guiding the user, further continues until the user decides to exit the RFMS application.

The present disclosure also provides a computer readable medium stored on a removable device comprising computer instructions that when executed enables a computer running a standard operating system to automatically boot into an alternative operating system stored on the removable device.

The present disclosure also provides a removable device storing a computer readable medium comprising computer instructions for automatically booting a computer running a standard operating system into an alternative operating system.

In an embodiment, the removable device is a removable USB device. Other removable devices may be used as known to persons skilled in the art.

All of the foregoing and still further objects and advantages of the invention will become apparent from a study of the following specification, taken in connection with the accompanying drawings wherein like characters of reference designate corresponding parts throughout the several views.

BRIEF DESCRIPTION OF THE FIGURES

Embodiments of the disclosure will be described by way of examples only with reference to the accompanying drawing, in which.

DETAILED DESCRIPTION OF PREFERRED EMBODIMENTS

Terminology

UEFI Firmware Application ID

Figure 1:
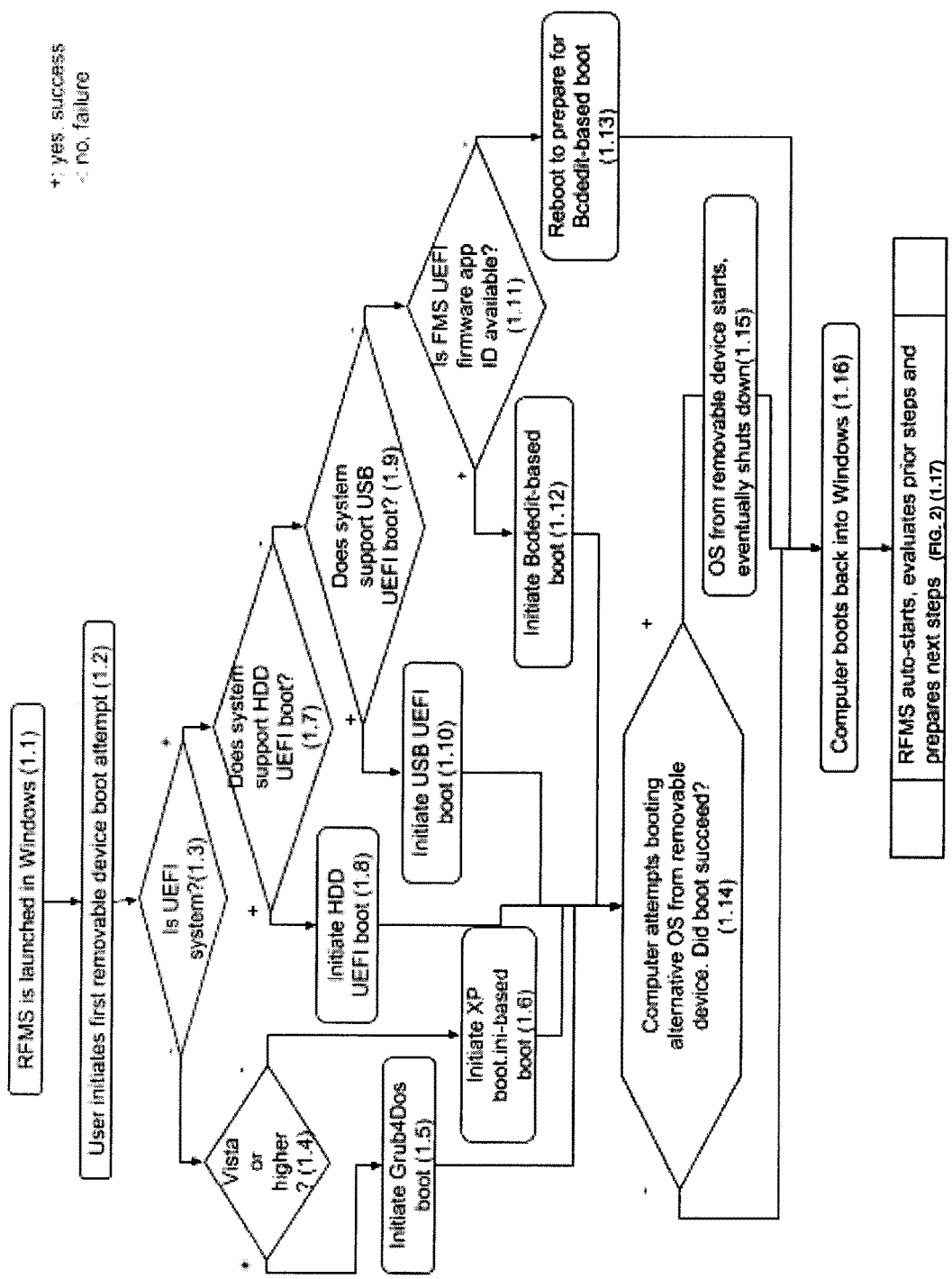
FIG. 1 is a flow chart depicting a method for automatically booting a computer to run from a removable device, in accordance with an illustrative embodiment of the present invention.

Windows has BCD (Boot Configuration Data) which is a firmware-independent database that the Windows boot loaded uses to boot up the operating system or the auxiliary tools. The entries inside this database are called BCD firmware objects or applications. Each BCD object has an ID, and is associated with a bootable option that boot loader can try booting. On UEFI computer the boot loader examines the hardware and records all hardware devices it recognizes as bootable through UEFI mechanism in the BCD database. So bootable devices each get UEFI firmware application objects, and these objects have their unique identifiers. We call these identifiers the UEFI firmware application IDs.

RFMS

There exists (provided by FixMeStick Inc.) a Windows application component that is used by users to boot computer into the alternative operating system carried on the USB device. We call this component RFMS in the rest of this document.

Detailed Explanation of Booting Techniques Utilized by the Present Invention

The techniques described herein are provided to explain the complete context of the present invention. The individual booting techniques described here have a limited success rate of booting computers from various manufacturers and of various models into alternative OS from a removable device.

Direct HDD UEFI Booting

The UEFI specification section 9.3.6.4 refers to possibility of defining boot options that use path to the EFI file on the hard-drive within a computer as a path to a bootable device. UEFI firmware encountering such boot option in the priority list attempts to boot OS from the standard EFI image pointed to by the hard-drive and the file path in the BootXXX option defined in the NVRAM of the computer. If the BootNext NVRAM variable is then assigned to the value of such boot option, the next time the computer is rebooted, it would load operating system from the EFI file pointed by the BootXXXX boot option. Typically the default boot options on UEFI-firmware-based computers are these types of boot options.

Tests reveal that EF-file-based booting of alternative OS from removable device is not reliable.

Direct USB UEFI Booting

The UEFI specification section 9.3.5.5 refers to possibility of defining boot options that use USB device path as a path to a bootable device. The specification explains that it is possible to create a UEFI boot option (BootXXXX variable in computer's NVRAM memory) that has EFI device path pointing to one of the physical USB ports of the computer. If the BootNext NVRAM variable is then assigned to the value of such boot option, the next time the computer is rebooted, it would load operating system from the USB device pointed by the BootXXXX boot option. Tests reveal that this booting technique alone is not reliable. And in some cases requires adjustments to USB interface and USB port values during the creation of the required boot options.

Bcdedit-Based Booting

Windows versions Vista and higher have a special utility "bcdedit.exe" that allows making temporary changes to the booting of the operating system. It is possible for example to use "bcdedit.exe" to configure and UEFI-firmware-based computer system to boot operating system from a removable device if such device was detected during the last boot sequence of the computer and if there is a special application ID assigned to such device. This invention makes use of "bcdedit.exe" to configure booting from removable devices.

Grub4dos Booting

GRUB for DOS is an universal boot loader based on GNU GRUB technology. It can be used in conjunction with Bcdedit.exe-based booting, to force Windows computer boot from removable devices. The present invention preferably makes use of Grub4Dos on non-UEFI computers with Windows Vista or higher versions.

Boot.Ini-Based Booting

Windows XP boot mechanism depends on the contents of the file boot.ini located in the root directory of the system drive. The file may have one or more entries each corresponding to a boot option that user may choose at system startup. The first entry in the file is the default boot entry. It is possible to add entry into this file and allow computer to boot from removable device. The present invention preferably makes use of boot.ini to configure booting from removable device.

BIOS-Based Manual Booting

Large number of computers provide user a possibility to manually interfere into boot process and guide the computer to boot into alternative OS. This is usually done through pressing a special key during the boot process which results in a special firmware user interface being shown which permits choosing the method of booting. Such firmware user interface (BIOS menu) typically detects and presents user with choice of booting OS from removable device if such device is plugged into the computer at time when system is rebooted or powered on. On some computer models though such firmware user interface may be disabled, or does not permit booting into OS from a removable device.

Referring to FIG. 1, there is shown a flow chart for the launching of an application for booting guidance (RFMS) on a Windows OS-based computer from a removable device. At step 1.1, the RFMS Windows application is launched by a user from the removable storage device. At step 1.2, through the user interface of the RFMS application, the user initiates a reboot of the computer to attempt booting an alternative operating system (OS) from the removable device. At step 1.3, the computer is checked to see if UEFI booting is supported or not. If UEFI is supported, the method proceeds to step 1.7. If UEFI is not supported, the method proceeds to step 1.4. At step 1.4, the computer is checked to determine which version of Windows is installed. If it has Windows Vista or higher, the method proceeds to step 1.5, where a Grub4Dos-based boot into an alternative OS is initiated from the removable device before proceeding to step 1.14. Otherwise, if the computer is illustratively running Windows XP, the method proceeds to step 1.6, where an XP boot.ini-based boot into an alternative OS is initiated from the removable device before proceeding to step 1.14.

Returning to step 1.7, the computer vendor/model/BIOS version is checked for support of the HDD UEFI boot technique. If yes, the method proceeds to step 1.8, where the HDD UEFI boot technique is initiated to trigger the computer to restart into the alternative OS from the removable device before proceeding to step 1.14. If no, the method proceeds to step 1.9, where the computer vendor/model/BIOS is checked for support of the USB UEFI boot technique. If yes, the method proceeds to step 1.10, where the USB UEFI boot technique is initiated to trigger the computer to restart into the alternative OS from the removable device before proceeding to step 1.14. If no, the method proceeds to step 1.11, where the Windows startup session is checked to have matched the removable device with the alternative OS as a device with an assigned UEFI application ID. If yes, the method proceeds to step 1.12, where a "bcdedit.exe"-based boot technique is initiated to trigger the computer to restart into the alternative OS from the removable device before proceeding to step 1.14. If no, the method proceeds to step 1.13, where a computer restart is triggered and RFMS is configured to restart automatically before proceeding to step 1.16.

Returning to step 1.14, the computer attempts to boot into the alternative OS from the removable device. If it succeeds, step 1.15 automatically begins and the alternative OS is booted from the removable device and at some point in time after booting the computer is eventually restarted. If it does not succeed, the method proceeds to step 1.16. At step 1.16, the computer boots back into Windows. Then, at step 1.17, the RFMS automatically starts up after the reboot into Windows and the method continues to guide the user to successfully boot into the alternative OS, as seen in FIG. 2.

Figure 2:
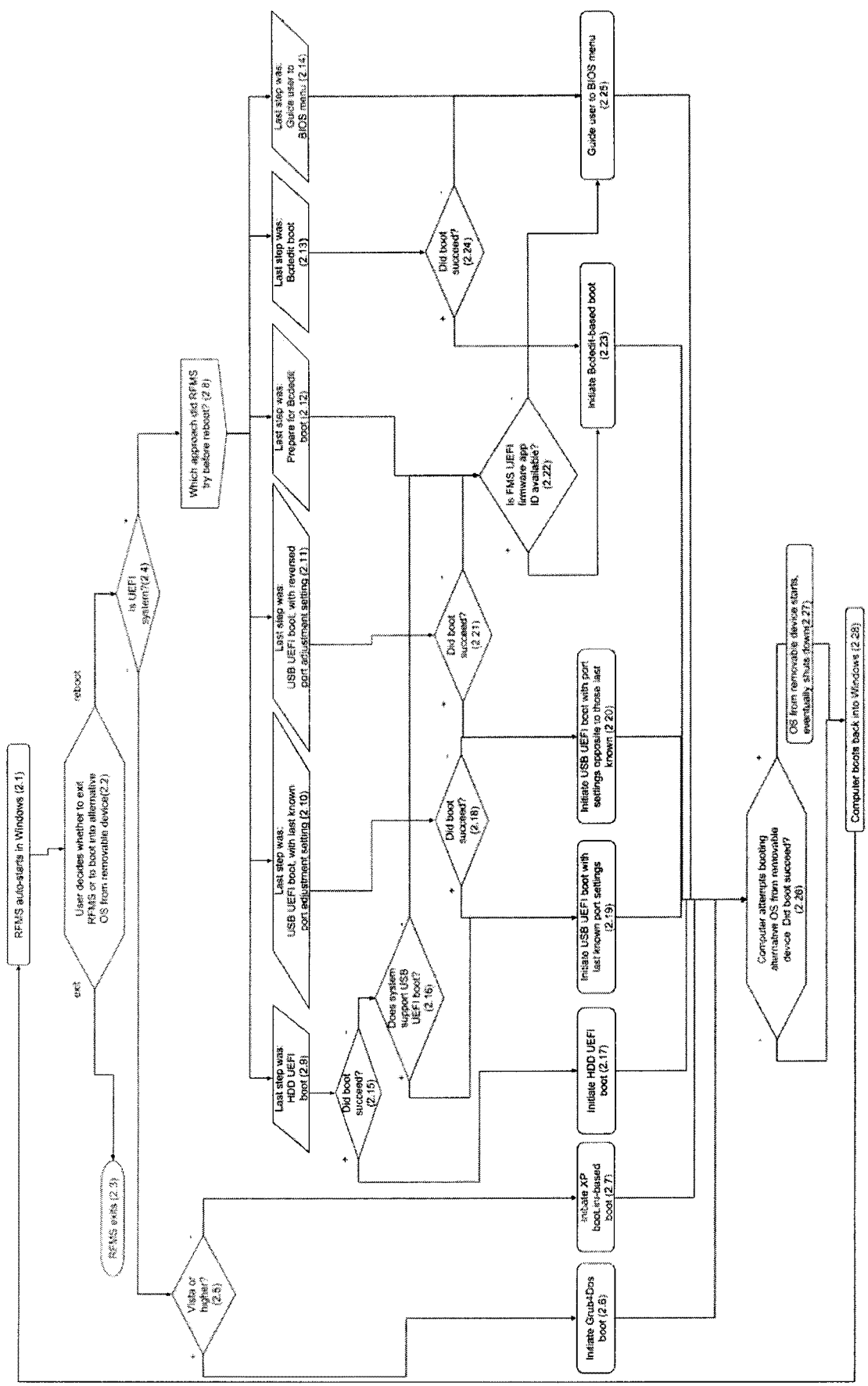
FIG. 2 is a flow chart depicting a method for automatically starting an application for booting a computer from a removable device, in accordance with an illustrative embodiment of the present invention.

Referring now to FIG. 2, there is shown a flow chart for the auto-starting of the RFMS after either a failed booting attempt into the alternative OS or a successful boot into the alternative OS followed by an eventual computer restart. At step 2.1, the RFMS application automatically starts in Windows. At step 2.2, the user must decide whether they would like to exit the RFMS application and proceed to use Windows OS, or attempt to boot into the alternative OS from the removable device. If the user chooses to exit, the RFMS does so at step 2.3. If the user chooses to boot into the alternative OS from the removable device, the method proceeds to step 2.4 and the computer is checked to see if UEFI booting is supported or not. If UEFI booting is not supported, at step 2.5 the computer is checked to determine which version of Windows is installed. If it has Windows Vista or higher, the method proceeds to step 2.6, where a Grub4Dos-based boot into an alternative OS is initiated from the removable device before proceeding to step 2.26. Otherwise, if the computer is illustratively running Windows XP, the method proceeds to step 2.7, where an XP boot.ini-based boot into an alternative OS is initiated from the removable device before proceeding to step 2.26.

Returning to step 2.4, if the computer does support UEFI booting, the method proceeds to step 2.8 to determine the last step the RFMS tried before the reboot occurred: an HDD UEFI boot (step 2.9), a USB UEFI boot with last known port adjustment setting (step 2.10), a USB UEFI boot with reversed port adjustment setting (step 2.11), preparation for a Bcdedit-based boot (step 2.12), a Bcdedit-based boot (step 2.13) or guiding the user to the BIOS menu (step 2.14).

If the last attempted step was a HDD UEFI boot (step 2.9), at step 2.15 the method checks if this boot succeeded. If yes, at step 2.17 the HDD UEFI boot is initiated before proceeding to step 2.26. If no, at step 2.16 the system is checked if USB UEFi booting is supported. If yes, at step 2.19 a USB UEFI boot with last known port settings is initiated before proceeding to step 2.26. If no, at step 2.22 the method checks if the FMS UEFI firmware app ID is available. If yes, at step 2.23 a Bcdedit-based boot is initiated before proceeding to step 2.26. If no, at step 2.25 the method guides the user to the BIOS menu before proceeding to step 2.26.

Returning to step 2.8, if the last attempted step was a USB UEFI boot with last known port adjustment setting (step 2.10), at step 2.18 the method checks if this boot succeeded. If yes, at step 2.19 a USB UEFI boot with last known port settings is initiated before proceeding to step 2.26. If no, at step 2.20 a USB UEFI boot with port settings that are opposite to the last known port settings used is initiated before proceeding to step 2.26.

Returning to step 2.8, if the last attempted step was a USB UEFI boot with reversed port adjustment setting (step 2.11), at step 2.21 the method checks if this boot succeeded. If yes, at step 2.20 a USB UEFI boot with port settings that are opposite to the last known port settings used is initiated before proceeding to step 2.26. If no, at step 2.22 the method checks if the FMS UEFI firmware app ID is available. If yes, at step 2.23 a Bcdedit-based boot is initiated before proceeding to step 2.26. If no, at step 2.25 the method guides the user to the BIOS menu before proceeding to step 2.26.

Returning to step 2.8, if the last attempted step was preparing for a Bcdedit-based boot (step 2.12), at step 2.22 the method checks if the FMS UEFI firmware app ID is available. If yes, at step 2.23 a Bcdedit-based boot is initiated before proceeding to step 2.26. If no, at step 2.25 the method guides the user to the BIOS menu before proceeding to step 2.26.

Returning to step 2.8, if the last attempted step was a Bcdedit-based boot (step 2.13), at step 2.24 the method checks if this boot succeeded. If yes, at step 2.23 a Bcdedit-based boot is initiated before proceeding to step 2.26. If no, at step 2.25 the method guides the user to the BIOS menu before proceeding to step 2.26.

Returning to step 2.8, if the last attempted step was guiding the user to the BIOS menu (step 2.14), at step 2.25 the user is again guided to the BIOS menu for manual booting before proceeding to step 2.26.

At step 2.26, the computer attempts booting the alternative OS from the removable device. If this boot succeeds, the OS from the removable device starts at step 2.27, then eventually shuts down and the computer boots back into Windows at step 2.28. If the boot at step 2.26 does not succeed, the computer boots back into Windows at step 2.28.

The booting techniques are applied by the RFMS in a priority order that depends on the type of Windows-based computing device being used.

If one booting technique fails to boot the computer into the alternative operating system from the removable device, the guiding RFMS application automatically starts upon reboot into the host Windows OS and displays a user interface which guides the user to the subsequent booting attempt with the next technique in the priority list.

The process of attempting to boot into the alternative OS, and later having the computer boot back into Windows and the RFMS guiding the user, further continues until the user decides to exit the RFMS application.

The scope of the claims should not be limited by the preferred embodiments set forth in the examples, but should be given the broadest interpretation consistent with the description as a whole.

The invention claimed is:

1. A method for automatically booting a computer running a standard operating system into an alternative operating system from a removable device, the method comprising the steps of:
   receiving the removable device into the computer;
   receiving a first input from a user launching a dedicated application stored on the removable device for booting guidance;
   receiving a second input from said user directing said application to boot the computer into the alternative operating system through a user interface;
   said application determining a first booting technique to be used on the computer;
   said application configuring the computer accordingly;
   said application restarting the computer in an attempt to boot into the alternative operating system;
   said computer booting back into the standard operating system after one of:
      successful booting and running the alternative operating system;
      or failing to boot into the alternative operating system;
   said application automatically starting up;
   said application determining whether said attempt to boot into the alternative operating system was successful; and
   said application providing said user with a further simplified interface to:
      use said first booting technique to reboot the computer into the alternative operating system if said attempt to boot was successful;
      use a second booting technique to reboot the computer into the alternative operating system if said attempt to boot was unsuccessful; and
      guide the user into a manual booting sequence into the alternative operating system if all attempted booting techniques were unsuccessful.

2. The method of claim 1, wherein said further simplified interface continuously suggests further booting techniques until said application exits.

3. The method of claim 1, wherein the standard operating system is a Microsoft Windows-based operating system.

4. The method of claim 1, wherein the removable device is a removable USB device.

5. The method of claim 1, wherein the computer is a UEFI-based Windows PC, and said booting techniques comprise at least one of:
   direct HDD UEFI booting;
   USB UEFI booting;
   Bcdedit tool-based booting; and
   guidance for said user to manually boot into the alternative operating system from the removable device through a BIOS menu.

6. The method of claim 1, wherein the computer is a non-UEFI PC, the standard operating system is Windows Vista or higher, and said booting techniques comprise at least one of:
   Grub4Dos-based booting; and
   guidance for said user to manually boot into the alternative operating system from the removable device through a BIOS menu.

7. The method of claim 1, wherein the standard operating system is Windows XP, and said booting techniques comprise at least one of:
   boot.ini-based booting; and
   guidance for said user to manually boot into the alternative operating system from the removable device through a BIOS menu.

8. A computer readable medium stored on a removable device comprising computer instructions that when executed enable a computer running a standard operating system to automatically boot into an alternative operating system stored on the removable device by performing a method comprising the steps of:
   receiving the removable device into the computer;
   receiving a first input from a user launching a dedicated application stored on the removable device for booting guidance;
   receiving a second input from said user directing said application to boot the computer into the alternative operating system through a user interface;
   said application determining a first booting technique to be used on the computer;
   said application configuring the computer accordingly;
   said application restarting the computer in an attempt to boot into the alternative operating system;
   said computer booting back into the standard operating system after one of:
      successful booting and running the alternative operating system; or
      failing to boot into the alternative operating system;
   said application automatically starting up;
   said application determining whether said attempt to boot into the alternative operating system was successful; and
   said application providing said user with a further simplified interface to:
      use said first booting technique to reboot the computer into the alternative operating system if said attempt to boot was successful;
      use a second booting technique to reboot the computer into the alternative operating system if said attempt to boot was unsuccessful; and
      guide the user into a manual booting sequence into the alternative operating system if all attempted booting techniques were unsuccessful.

9. A removable device for automatically booting a computer running a standard operating system into an alternative operating system, the removable storage device storing a computer readable medium comprising computer instructions that when executed perform a method comprising the steps of:
   receiving the removable device into the computer;
   receiving a first input from a user launching a dedicated application stored on the removable device for booting guidance;
   receiving a second input from said user directing said application to boot the computer into the alternative operating system through a user interface;
   said application determining a first booting technique to be used on the computer;
   said application configuring the computer accordingly;
   said application restarting the computer in an attempt to boot into the alternative operating system;
   said computer booting back into the standard operating system after one of:
      successful booting and running the alternative operating system; or
      failing to boot into the alternative operating system;

said application automatically starting up;
said application determining whether said attempt to boot into the alternative operating system was successful; and
said application providing said user with a further simplified interface to:
 use said first booting technique to reboot the computer into the alternative operating system if said attempt to boot was successful;
 use a second booting technique to reboot the computer into the alternative operating system if said attempt to boot was unsuccessful; and
 guide the user into a manual booting sequence into the alternative operating system if all attempted booting techniques were unsuccessful.

* * * * *